(12) United States Patent
Fujiwara et al.

(10) Patent No.: US 8,975,849 B2
(45) Date of Patent: Mar. 10, 2015

(54) MOTOR CONTROL APPARATUS

(75) Inventors: Hiroshi Fujiwara, Osaka (JP); Toru Tazawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 135 days.

(21) Appl. No.: 13/699,211

(22) PCT Filed: May 25, 2011

(86) PCT No.: PCT/JP2011/002899
§ 371 (c)(1),
(2), (4) Date: Nov. 20, 2012

(87) PCT Pub. No.: WO2011/148623
PCT Pub. Date: Jan. 12, 2011

(65) Prior Publication Data
US 2013/0063064 A1 Mar. 14, 2013

(30) Foreign Application Priority Data

May 28, 2010 (JP) ................. 2010-122539

(51) Int. Cl.
G05B 5/00 (2006.01)
G05B 5/01 (2006.01)
H02P 29/00 (2006.01)
G05D 19/02 (2006.01)

(52) U.S. Cl.
CPC ............. H02P 29/00 (2013.01); G05D 19/02 (2013.01); H02P 29/0038 (2013.01)
USPC .......................................... 318/461; 318/619

(58) Field of Classification Search
CPC ........ G05B 19/19; G05D 19/02; H02P 29/00; H02P 29/0038
USPC ........... 318/461, 619, 77, 128, 146, 286, 369, 318/715; 322/30
See application file for complete search history.

(56) References Cited

U.S. PATENT DOCUMENTS

2008/0309279 A1* 12/2008 Tazawa .................... 318/619
2011/0221378 A1* 9/2011 Tazawa et al. ............ 318/619

FOREIGN PATENT DOCUMENTS

| JP | 2004-274976 | * | 9/2004 | ............... H02P 5/00 |
| JP | 2004-274976 A | | 9/2004 | |
| JP | 2005-223960 | * | 8/2005 | ............... H02P 5/00 |
| JP | 2005-223960 A | | 8/2005 | |
| JP | 2006-288124 | * | 10/2006 | ............. H02P 29/00 |
| JP | 2007-110860 A | | 4/2007 | |
| JP | 2007-293571 A | | 11/2007 | |

OTHER PUBLICATIONS

International Search Report for International Application No. PCT/JP2011/002899, dated Aug. 30, 2011, 2 pages.

* cited by examiner

*Primary Examiner* — Bentsu Ro
*Assistant Examiner* — Zemenay Truneh
(74) *Attorney, Agent, or Firm* — Brinks Gilson & Lione

(57) ABSTRACT

There are provided a first notch filter disposed in a feedback control system, an oscillation extracting filter for outputting signal x1 containing an oscillation component, a second notch filter for inputting signal x1, a notch control portion for changing a notch center frequency based on signal x1 and second notch filter output signal x2, a notch depth control portion for changing a notch depth of the first notch filter based on signal x1, and a control determining portion for carrying out control to operate either the notch control portion or the notch depth control portion.

16 Claims, 10 Drawing Sheets

MOTOR CONTROL APPARATUS

This application is a 371 applicatoin of PCT/JP2011/002899 having an international filing date of May 25, 2011, which claim priority of JP2010-122539 May 28, 2010, the entire contents of which are incorporated herein by reference.

TECHNICAL FIELD

The present invention relates to a motor control apparatus for controlling a moving operation such as a speed or a position of a motor or a load to be driven by the motor, and more particularly to a motor control apparatus having a function for suppressing machine resonance occurring in driving or the like.

BACKGROUND ART

Conventionally, a motor control apparatus of this type includes a motor control apparatus described in PTL 1. FIG. 10 is a block diagram showing a structure of the motor control apparatus described in PTL 1.

Conventional motor control apparatus 50 shown in FIG. 10 is connected to motor 11 and speed detector 13. Load 12 is linked to motor 11. Moreover, speed detector 13 detects a rotating speed of motor 11 and outputs speed detection signal Vd indicative of the detected rotating speed.

Motor control apparatus 50 has a speed control system for causing speed detection signal Vd to follow command speed signal Vr. Motor control apparatus 50 includes first notch filter 15 as shown in FIG. 10 in order to suppress an oscillation caused by machine resonance or the like. Furthermore, motor control apparatus 50 includes speed control portion 14, torque control portion 16, oscillation extracting filter 17, second notch filter 18, and notch control portion 19.

Speed control portion 14 inputs command speed signal Vr and speed detection signal Vd and generates torque command signal $\tau 1$. First notch filter 15 serves to apply sharp attenuation to a signal having a frequency within a predetermined range around a specific frequency contained in a supplied signal from the same signal. The frequency to be the center is referred to as a notch center frequency, a vicinal frequency range to be attenuated is referred to as a notch width, and a degree of the attenuation to be applied at the notch center frequency is referred to as a notch depth. Moreover, a frequency specified by the notch center frequency and the notch width is referred to as a notch frequency. First notch filter 15 has such a characteristic and attenuates a signal component of the notch frequency with respect to torque command signal $\tau 1$ and supplies, to torque control portion 16, torque command signal $\tau 2$ subjected to filter processing. Torque control portion 16 controls motor 11 in such a manner that motor 11 outputs a target torque based on torque command signal $\tau 2$ which is input.

Moreover, oscillation extracting filter 17 extracts an oscillation caused by machine resonance from speed detection signal Vd and outputs the oscillation as extracting oscillation signal x1. Extracting oscillation signal x1 is input to second notch filter 18. Second notch filter 18 carries out such filter processing as to attenuate the signal component of the notch frequency over extracting oscillation signal x1 depending on the control of notch control portion 19. Second notch filter 18 outputs second notch filter output signal x2 as the extracting oscillation signal subjected to the filter processing. Notch control portion 19 generates notch frequency set value cn1 based on extracting oscillation signal x1 and second notch filter output signal x2. Notch control portion 19 controls first notch filter 15 and second notch filter 18 based on notch frequency set value cn1 in such a manner that the notch frequencies of first notch filter 15 and second notch filter 18 are equivalent to an oscillation frequency of extracting oscillation signal x1.

In first notch filter 15, a notch depth in the notch frequency has a fixed value. In second notch filter 18, moreover, a notch depth in a notch frequency is represented by $-\infty$.

In the conventional motor control apparatus having such a structure, the notch frequencies of first notch filter 15 and second notch filter 18 are successively changed in such a manner that an oscillation component generated by an oscillation caused by machine resonance for some reason is decreased if any.

Moreover, another example of the conventional motor control apparatus is described in PTL 2. FIG. 11 is a block diagram showing a structure of the conventional motor control apparatus described in PTL 2.

The motor control apparatus shown in FIG. 11 includes notch filter 15b, notch frequency deciding portion 41, adaptive calculating portion 42, and filter coefficient setting portion 43. In notch filter 15b, a notch center frequency is fixed to notch frequency ωn by notch frequency deciding portion 41. On the other hand, a notch depth and a notch width are variable, and the notch depth and the notch width of notch filter 15b are decided based on filter coefficients $\xi 1$ and $\xi 2$ output from filter coefficient setting portion 43.

Adaptive calculating portion 42 successively changes adaptive input $\xi$ in accordance with adaptive law based on output $\tau 2$ of notch filter 15b and reference signal u, and outputs the changed input. Filter coefficient setting portion 43 outputs filter coefficients $\xi 1$ and $\xi 2$ indicative of the notch depth and the notch width in notch filter 15b based on adaptive input $\xi$ which is input.

In the conventional motor control apparatus shown in FIG. 11, the notch depth of notch filter 15b is successively changed in such a manner that an oscillation component of an oscillation caused by machine resonance is decreased when the oscillation is caused.

As in PTL 1, however, the notch depth does not take an optimum value in first notch filter 15 having the notch depth fixed. For this reason, there is a problem in that an oscillation is unnecessarily suppressed and a phase delay is thus increased depending on a control target, resulting in an insufficient increase in a control system gain.

As in PTL 2, moreover, there is fear that an oscillation caused by machine resonance or the like might not be sufficiently suppressed in the case in which a variation or aging in a characteristic of a machine, a deviation of a fixed notch frequency from a resonance frequency or the like occurs in notch filter 15b having the notch frequency fixed.

PTL 1: Unexamined Japanese Patent Publication No. 2004-274976
PTL 2: Unexamined Japanese Patent Publication No. 2007-293571

SUMMARY OF THE INVENTION

A motor control apparatus according to the present invention carries out feedback control over a quantity of state of a motor or load. The motor control apparatus includes a first notch filter, an oscillation extracting filter, a second notch filter, a notch control portion, a notch depth control portion, and a control determining portion. The first notch filter is disposed in a feedback control system and a notch center frequency and a notch depth of the first notch filter is changeable. The oscillation extracting filter extracts an oscillation component caused by machine resonance and outputs the oscillation component as an extracting oscillation signal. The second notch filter inputs the extracting oscillation signal and a notch center frequency of the second notch filter is changeable. The notch control portion changes the notch center frequency of the first notch filter and the notch center frequency of the second notch filter to decrease an amplitude of a second notch filter output signal based on the extracting oscillation signal and the second notch filter output signal. The notch depth control portion changes the notch depth of the first notch filter based on the extracting oscillation signal. The control determining portion carries out control to operate either the notch control portion or the notch depth control portion based on the extracting oscillation signal and the second notch filter output signal.

By the structure, also in the case in which a characteristic of the apparatus is changed due to aging or an oscillation frequency of machine resonance is varied by an influence of an application of the notch filter or the case in which a control system gain is increased to raise a speed of a command following operation, for example, it is possible to always suppress the machine resonance stably without causing an instability of the control system.

According to the motor control apparatus in accordance with the present invention, therefore, it is possible to provide a motor control apparatus which can suppress machine resonance without unnecessarily increasing a phase delay when the machine resonance occurs and controls a moving operation of a motor or a load thereof while always ensuring a stable control state.

DETAILED DESCRIPTION OF THE PREFERRED EMBODIMENTS

Exemplary embodiments according to the present invention will be described below with reference to the drawings.

First Exemplary Embodiment

Figure 1:
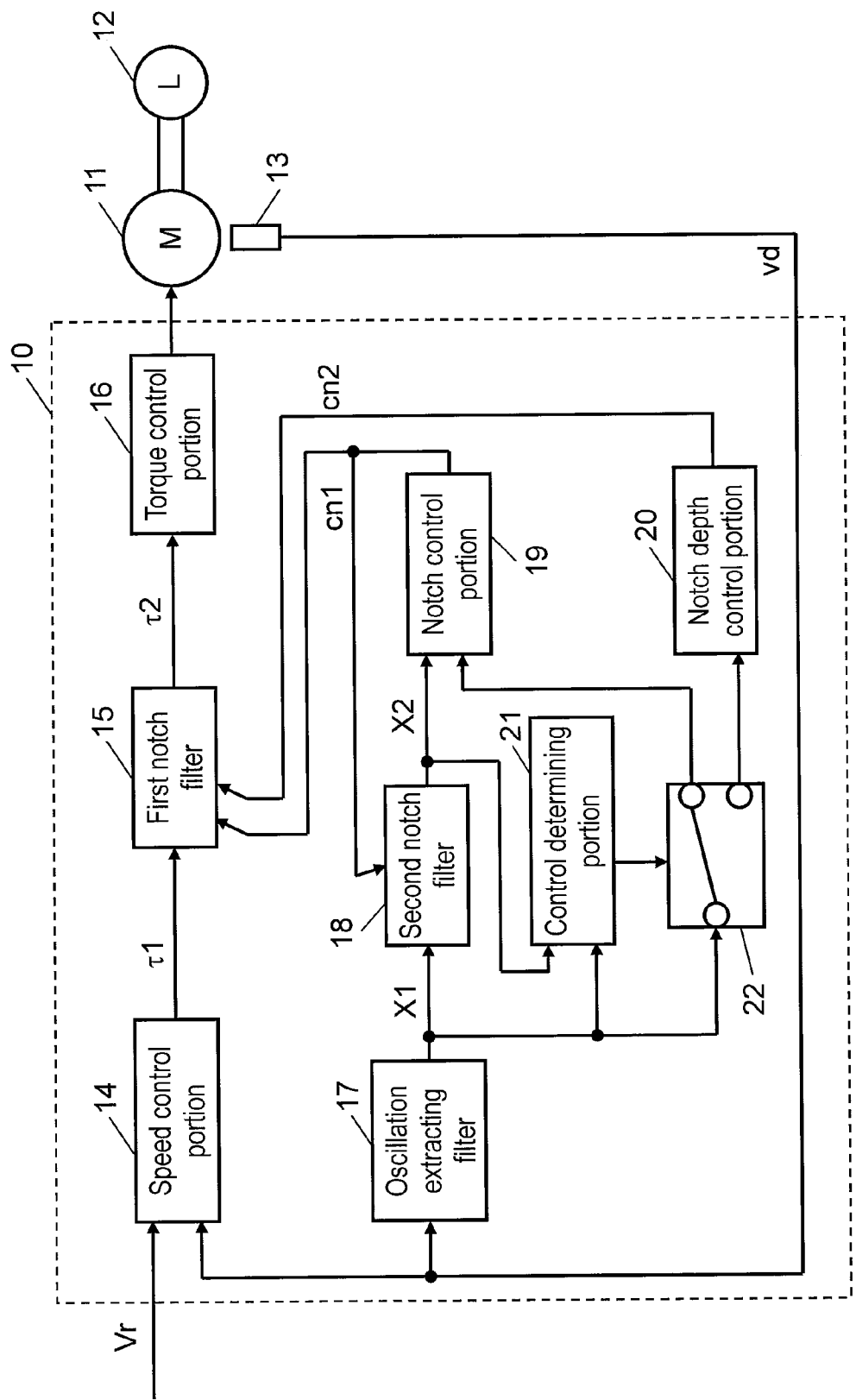
FIG. 1 is a block diagram showing a structure of a motor control apparatus according to a first exemplary embodiment of the present invention.

FIG. 1 is a block diagram showing a structure of motor control apparatus 10 according to a first exemplary embodiment of the present invention.

As shown in FIG. 1, motor control apparatus 10 according to the first exemplary embodiment of the present invention is connected to motor 11 and speed detector 13. Load 12 is linked to motor 11. Moreover, speed detector 13 measures a rotating speed of a movable member (not shown) provided in motor 11 and outputs speed detection signal Vd to be a state detection signal indicative of a speed quantity depending on the rotating speed. On the other hand, motor control apparatus 10 is notified of command speed signal Vr in order to give a command for the rotating speed of the movable member. Motor control apparatus 10 has a speed control system for carrying out feedback control in such a manner that a rotating operation of the movable member follows a command speed as a control system for carrying out the feedback control. In other words, in the present exemplary embodiment, a speed quantity to be a state quantity is subjected to the feedback control. In the present exemplary embodiment, description will be given by taking an example of a motor control apparatus having a structure including the speed control system.

As shown in FIG. 1, motor control apparatus 10 includes speed control potion 14, first notch filter 15, torque control portion 16, oscillation extracting filter 17, second notch filter 18, notch control portion 19, notch depth control portion 20, control determining portion 21, and switching portion 22.

Command speed signal Vr indicative of a command speed and speed detection signal Vd indicative of a detection speed detected by speed detector 13 are input to speed control portion 14. Speed control portion 14 calculates a deviation quantity of command speed signal Vr from speed detection signal Vd and generates and outputs torque command signal τ1 for controlling the deviation quantity to be zero. More specifically, speed control portion 14 calculates a difference between command speed signal Vr and speed detection signal Vd, for example, and outputs, as torque command signal τ1, a result obtained by carrying out proportional integral over the calculated value.

Figure 2:
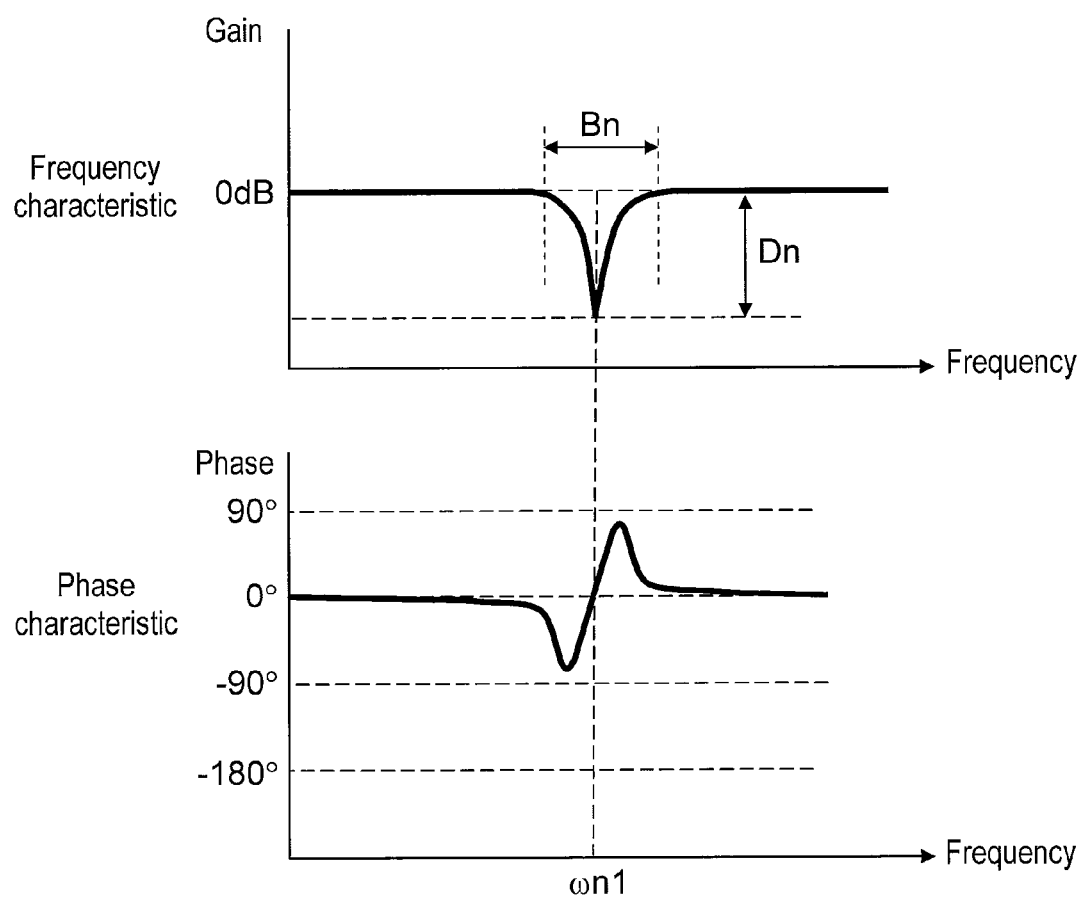
FIG. 2 is a characteristic chart showing an example of a frequency characteristic and a phase characteristic of a first notch filter in the motor control apparatus.

Torque command signal τ1 is supplied from speed control portion 14 to first notch filter 15. Furthermore, notch frequency set value cn1 and notch depth set value cn2 are supplied from notch control portion 19 and notch depth control portion 20 to first notch filter 15, respectively. First notch filter 15 serves to apply sharp attenuation to a signal component having a frequency around a specific frequency contained in torque command signal τ1 from torque command signal τ1. FIG. 2 is a characteristic chart showing an example of a frequency characteristic and a phase characteristic of first notch filter 15 in motor control apparatus 10 according to the first exemplary embodiment of the present invention. FIG. 2 shows an example of such a frequency characteristic as to attenuate a signal component in a frequency band of a vicinal frequency setting notch width Bn in accordance with notch depth Dn around notch center frequency ωn1. In first notch filter 15, notch center frequency ωn1 and notch depth Dn are changed based on notch frequency set value cn1 and notch depth set value cn2 which are supplied, respectively. Notch depth set value cn2 has a feature that notch depth Dn is greater (deeper) when notch depth set value cn2 is smaller and is smaller (shallower) when notch depth set value cn2 is greater.

First notch filter 15 is a secondary recursion type notch filter having transfer function $H_1(s)$ expressed in the following (Equation 1), for example.

[Equation 1]

$$H_1(s) = \frac{s^2 + 2d_1\zeta_1\omega_{n1} + \omega_{n1}^2}{s^2 + 2\zeta_1\omega_{n1} + \omega_{n1}^2}$$ (Equation 1)

In (Equation 1), $\omega_{n1}$ represents a notch center frequency coefficient corresponding to notch center frequency ωn1 of first notch filter 15, $\zeta_1$ represents an attenuation constant, and $d_1$ represents a notch depth coefficient indicative of notch depth Dn. Notch depth coefficient $d_1$ is in a range of $0 \leq d_1 \leq 1$. In the case of $d_1=1$, a gain characteristic in notch center frequency ωn1 of first notch filter 15 is 0 [dB]. In the case of $d_1=0$, a gain characteristic in notch center frequency ωn1 of first notch filter 15 is $-\infty$ [dB]. In other words, in the case of $d_1=1$, an input signal of first notch filter 15 is output as it is from first notch filter 15. In the case of $d_1=0$, moreover, an attenuation quantity of a signal component of notch center frequency ωn1 is a maximum so that a signal obtained by attenuating a signal component of a frequency in the vicinity of notch center frequency ωn1 is output from first notch filter 15. In the present exemplary embodiment, notch center frequency coefficient $\omega_{n1}$ is changed based on notch frequency set value cn1 so that notch center frequency ωn1 is varied, and notch depth coefficient $d_1$ is changed based on notch depth set value cn2 so that notch depth Dn is varied. Torque command signal τ2 to be a signal obtained by thus carrying out the filter processing over torque command signal τ1 is output from first notch filter 15.

Torque command signal τ2 output from first notch filter 15 is input to torque control portion 16. Torque control portion 16 controls a rotating operation of motor 11 in such a manner that motor 11 outputs a target torque.

Consequently, a speed control system is constituted in motor control apparatus 10. The speed control system utilizes speed detection signal Vd indicative of a rotating speed of a movable member which is detected by speed detector 13, thereby carrying out feedback control over a moving operation of the movable member in such a manner that the rotating speed of the movable member depends on command speed signal Vr. Motor control apparatus 10 has a structure in which first notch filter 15 is disposed in the speed control system.

In the present exemplary embodiment, moreover, motor control apparatus 10 has a function for automatically suppressing machine resonance occurring in the case in which load 12 is driven or the like. In order to implement the function, motor control apparatus 10 disposes first notch filter 15 described above in the speed control system, and furthermore, includes oscillation extracting filter 17 to be an extracting filter for extracting an oscillation component of machine resonance or the like. Speed detection signal Vd output from speed detector 13 is also supplied to oscillation extracting filter 17.

Oscillation extracting filter 17 has a predetermined frequency band set thereto and extracts an oscillation component contained in the set frequency band from speed detection signal Vd. In other words, an oscillation extracting filter extracts and outputs an oscillation component appearing in speed detection signal Vd which is input, for example, an oscillation component of machine resonance occurring when load 12 is driven by motor 11. Oscillation extracting filter 17 may be a high pass filter for causing a signal component having a predetermined frequency or more to pass therethrough or a band pass filter for causing a signal component in a predetermined frequency bandwidth to pass therethrough because it is sufficient that the oscillation component can be thus extracted. Oscillation extracting filter 17 outputs extracting oscillation signal x1 to be a signal passing through the filter of the frequency characteristic, that is, a signal from which an oscillation component appearing in speed detection signal Vd is extracted.

Extracting oscillation signal x1 output from oscillation extracting filter 17 is input to second notch filter 18, control determining portion 21, and switching portion 22. Furthermore, extracting oscillation signal x1 is input to either notch control portion 19 or notch depth control portion 20 in accordance with switching of switching portion 22. Moreover, the details will be described below. By these structures, the characteristic of first notch filter 15 is set.

First of all, second notch filter 18 outputs a signal which applies sharp attenuation to a signal component having a frequency around a specific frequency contained in extracting oscillation signal x1. Furthermore, notch frequency set value cn1 is supplied from notch control portion 19 to second notch filter 18. In the present exemplary embodiment, a predetermined value is previously given to a notch width and a notch depth in a notch center frequency is set to be $-\infty$ [dB] as the characteristic of second notch filter 18. For example, there is set a secondary recursion type notch filter having transfer function $H_2(s)$ expressed in the following (Equation 2).

[Equation 2]

$$H_2(s) = \frac{s^2 + \omega_{n2}^2}{s^2 + 2\zeta_2\omega_{n2} + \omega_{n2}^2}$$ (Equation 2)

Figure 3:
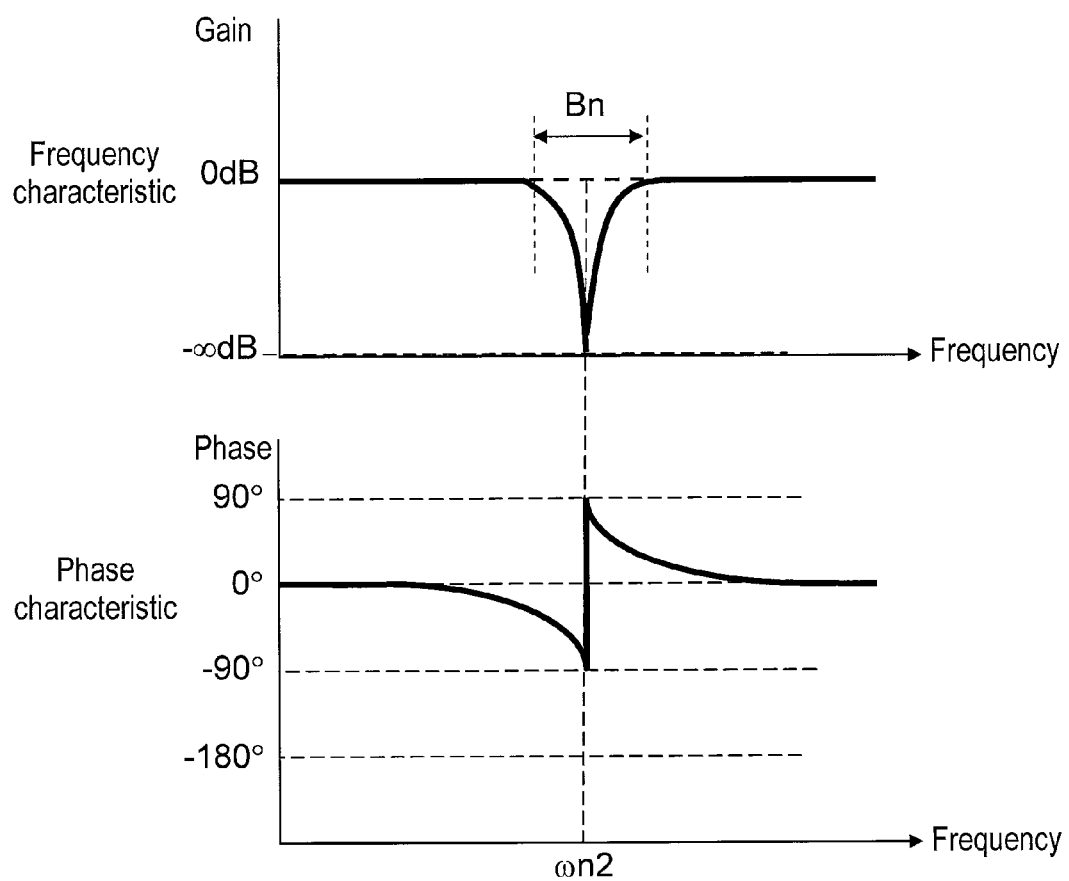
FIG. 3 is a characteristic chart showing an example of a frequency characteristic and a phase characteristic of a second notch filter in the motor control apparatus.

Herein, $\omega_{n2}$ represents a notch center frequency coefficient corresponding to notch center frequency ωn2 of second notch filter 18, and $\zeta_2$ represents an attenuation constant. A frequency characteristic is the same as that of first notch filter 15, and there is possessed a characteristic shown in FIG. 3. As is apparent from FIG. 3, there is possessed a characteristic in which a component having notch center frequency ωn2 is suppressed. In second notch filter 18, moreover, a gain characteristic corresponding to notch depth Dn in FIG. 2 is set to $-\infty$ [dB]. In the present exemplary embodiment, furthermore, notch center frequency coefficient $\omega_{n2}$ is changed based on notch frequency set value cn1 so that notch center frequency ωn2 is varied. First notch filter 15 and second notch filter 18 are changed with equal set value cn1 based on (Equation 1) and (Equation 2). Therefore, notch center frequency ωn1 and notch center frequency ωn2 are changed to be an equal frequency. Second notch filter output signal x2 (hereinafter, appropriately referred to simply as signal x2) to be a signal obtained by carrying out a filter processing over extracting oscillation signal x1 (hereinafter, appropriately referred to simply as signal x1) is output from second notch filter 18. Signal x2 is supplied to notch control portion 19 and control determining portion 21.

When an oscillation frequency of an oscillation component contained in signal x1 to be an input is greatly different from notch center frequency ωn2 in second notch filter 18, an amplitude of signal x1 is not suppressed. On the other hand, when they are coincident with each other, the amplitude is suppressed. For this reason, the amplitude of signal x2 is increased gradually when the oscillation frequency of signal x1 deviates from notch center frequency ωn2. In other words, it is apparent that signal x2 indicates a degree of the deviation of the oscillation frequency of signal x1 and notch center frequency ωn2.

Next, notch control portion 19 generates and outputs notch frequency set value cn1 (hereinafter, appropriately referred to simply as set value cn1) based on signal x2 and signal x1 supplied through switching portion 22. Set value cn1 is supplied to first notch filter 15 and second notch filter 18, and notch center frequency $\omega n1$ and notch center frequency $\omega n2$ are set depending on set value cn1, respectively. Notch control portion 19 uses signal x1 and signal x2 to change set value cn1 in such a manner that the amplitude of supplied signal x2 is reduced. Based on set value cn1, notch center frequency $\omega n2$ of second notch filter 18 is changed. Notch control portion 19 thus changes set value cn1 successively to control notch center frequency $\omega n2$ of second notch filter 18 until the amplitude of signal x2 is equal to or smaller than a predetermined value or reaches zero. It is possible to implement the control of the notch filter by combining second notch filter 18 with a directional filter or notch filter coefficient correcting means described in PTL 1, for example. Consequently, notch center frequency $\omega n2$ is controlled to be a frequency of the oscillation component contained in signal x1. Therefore, set value cn1 is caused to correspond to the frequency of the oscillation component.

Moreover, notch center frequency $\omega n2$ is thus changed depending on set value cn1, and furthermore, notch center frequency $\omega n1$ of first notch filter 15 is also changed to be equal to notch center frequency $\omega n2$. In other words, when the control is carried out to obtain notch center frequency $\omega n2 = \omega n$ by notch control portion 19 and second notch filter 18, notch center frequency $\omega n1$ is also set to be notch center frequency $\omega n1 = \omega n$. For this reason, notch center frequency $\omega n1$ of first notch filter 15 is also controlled to be a frequency of an oscillation component extracted by oscillation extracting filter 17.

Next, notch depth control portion 20 generates and outputs notch depth set value cn2 (hereinafter, appropriately referred to simply as set value cn2) based on signal x1 supplied through switching portion 22. Set value cn2 is supplied to first notch filter 15 and notch depth Dn is set depending on set value cn2. Notch depth control portion 20 monitors whether an oscillation component is contained in supplied signal x1 or not. If the oscillation component is detected, set value cn2 is changed to further increase notch depth Dn and is supplied to first notch filter 15.

Subsequently, control determining portion 21 determines whether notch control portion 19 is to be operated or notch depth control portion 20 is to be operated based on signal x1 and signal x2 which are supplied. Control determining portion 21 controls switching portion 22 based on the determination. Consequently, signal x1 is supplied to notch control portion 19 or notch depth control portion 20 in accordance with the determination of control determining portion 21. More specifically, signal x1 is first set to be supplied to notch control portion 19. If control determining portion 21 determines that the oscillation component is detected in signal x1 and is not detected in signal x2, switching portion 22 is switched in such a manner that signal x1 is supplied to notch depth control portion 20. If control determining portion 21 determines that the oscillation component is not detected from signal x1, switching portion 22 is switched in such a manner that signal x1 is supplied to notch control portion 19 again.

By the structure described above, if it is determined that the oscillation component is contained in extracting oscillation signal x1, notch center frequency $\omega n1$ of first notch filter 15 is set to be the frequency of the oscillation component by notch control portion 19. After notch center frequency $\omega n1$ is set, furthermore, notch depth Dn of first notch filter 15 is set to obtain such a notch depth that the oscillation component contained in extracting oscillation signal x1 can be suppressed by notch depth control portion 20. In the present exemplary embodiment, by employing the structure, it is possible to prevent an oscillation from unnecessarily being excessively suppressed. Therefore, it is possible to suppress an oscillation caused by machine resonance or the like while ensuring a stable operation of a control system.

Figure 4:
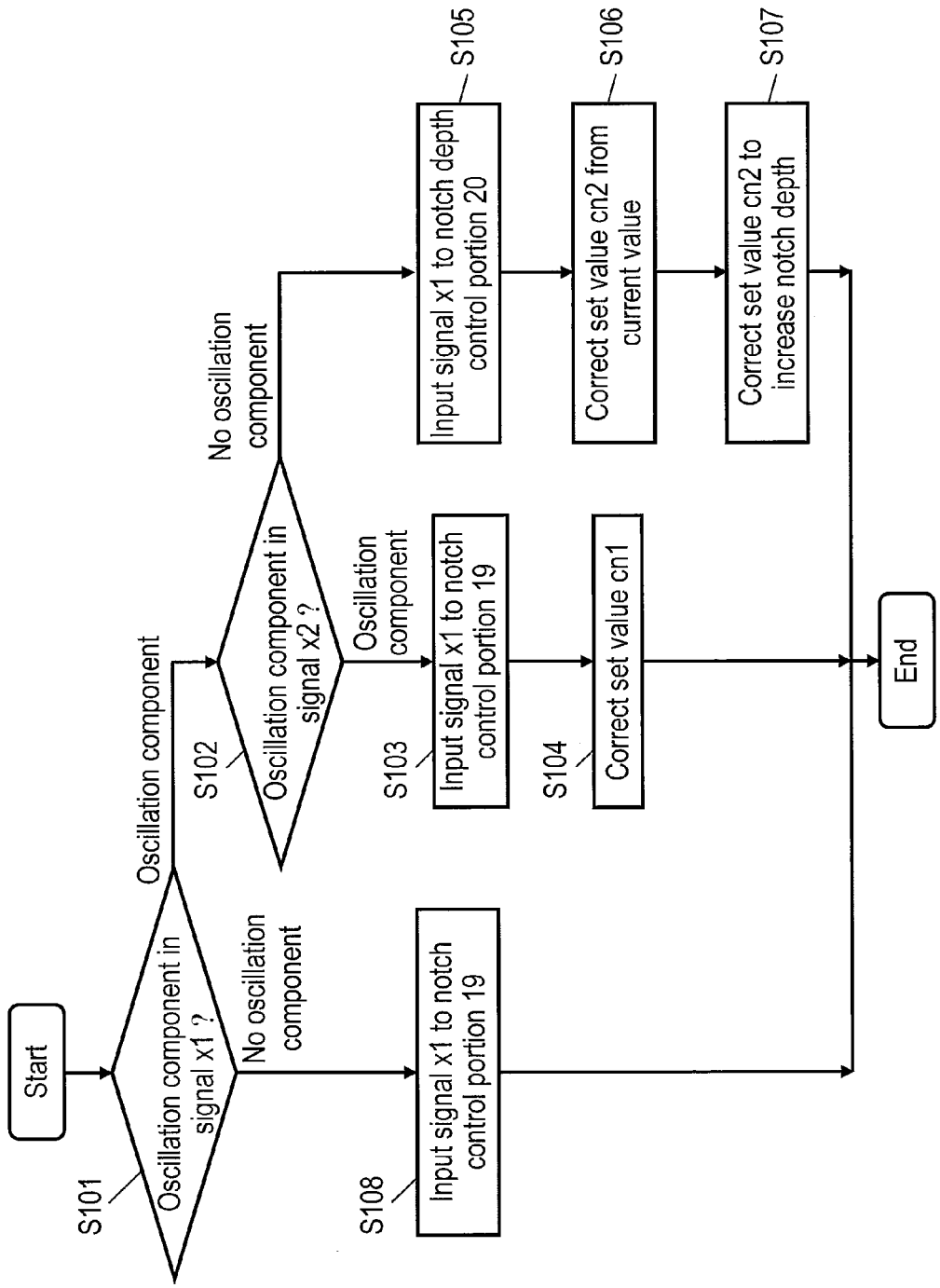
FIG. 4 is a flow chart showing a characteristic set processing of the first notch filter in the motor control apparatus.

Next, the operation of motor control apparatus 10 will be described in detail. FIG. 4 is a flow chart showing a characteristic set processing of first notch filter 15 according to the first exemplary embodiment of the present invention. The processing in FIG. 4 is repetitively carried out every control cycle.

First of all, control determining portion 21 confirms whether an oscillation is generated based on the amplitude of extracting oscillation signal x1 or not at Step S101. If it is determined that the oscillation is generated, that is, the oscillation component is present in signal x1, control determining portion 21 further proceeds to Step S102 in which it is determined whether the oscillation component is present in signal x2 or not. Whether the oscillation component is present is determined by detecting whether an amplitude of a signal is zero or is not zero or comparing the amplitude of signal x1 or signal x2 with a threshold of a predetermined value to determine that the oscillation component is present when the amplitude of the signal exceeds the threshold, for example.

If control determining portion 21 determines that signal x2 has the oscillation component at Step S102, the processing proceeds to Step S103. In other words, in this case, both signal x1 and signal x2 have oscillation components. Therefore, it is determined that oscillation frequency of signal x1 is not coincident with notch center frequency $\omega n2$ of second notch filter 18. Control determining portion 21 operates notch control portion 19 based on the determination to control notch center frequency $\omega n1$ of first notch filter 15 so as to be the frequency of oscillation component of signal x1. In other words, at Step S103, control determining portion 21 controls switching portion 22 so as to input signal x1 to notch control portion 19. At Step S104, then, notch control portion 19 carries out an operation for correcting notch frequency set value cn1. The processing from Step S101 to Step S104 is repeated every control cycle until it is determined that signal x2 has no oscillation component at Step S102.

The processing for repeating Steps S101 to S104 is executed in the following manner in more detail. First of all, notch center frequency $\omega n2$ of second notch filter 18 is decided by set value cn1 which is always corrected and input until it is determined that signal x2 has no oscillation component. On the other hand, first notch filter 15 holds set value cn1 which has not been changed when set value cn1 is changed, and sets changed set value cn1 when the change of set value cn1 is stopped. In other words, in the case in which notch center frequency $\omega n1$ of first notch filter 15 is also processed to be always corrected, the state of signal x1 might also be changed correspondingly so that the operation of notch control portion 19 might be unstable. For this reason, by employing a procedure for setting notch center frequency $\omega n1$ after deciding notch center frequency $\omega n2$, it is possible to stably execute the operation of notch control portion 19.

If control determining portion 21 determines that signal x2 has no oscillation component at Step S102, moreover, the processing proceeds to Step S105. In other words, in this case, the oscillation component is detected in signal x1 and is not detected in signal x2. Therefore, it is determined that the oscillation frequency of signal x1 is coincident with notch center frequency ωn2 of second notch filter 18, and furthermore, is also coincident with notch center frequency ωn1 of first notch filter 15.

At Step S105, control determining portion 21 controls switching portion 22 so as to input signal x1 to notch depth control portion 20. At Step S106, then, notch depth control portion 20 sets to start the operation for correcting notch depth set value cn2 from a current value. Moreover, the operation for correcting set value cn2 is carried out to increase notch depth Dn at Step S107 by notch depth control portion 20. The processing from Step S101 to Step S107 is repeated every control cycle until it is determined that signal x1 has no oscillation component at Step S101.

The processing for repeating Steps S101 to S107 is executed in the following manner in more detail. First of all, an initial value of set value cn2 is set to obtain notch depth coefficient $d_1=1$ of first notch filter 15. Then, a successive changing operation is carried out in such a manner that the notch depth is increased, that is, notch depth coefficient $d_1$ is reduced. If it is determined that signal x1 has no oscillation component, the changing operation is stopped.

For example, notch depth control portion 20 successively carries out an operation for changing set value cn2 in such a manner that notch depth coefficient $d_1$ is decreased by a predetermined quantity if signal x1 contains the oscillation component. As a result, a gain characteristic in notch center frequency ωn1 of first notch filter 15 is gradually decreased. Correspondingly, the amplitude of the oscillation component of oscillation frequency ωn1 contained in signal x1 is also reduced gradually. In the case in which the amplitude of signal x1 is zero or is equal to or smaller than a threshold, the successive changing operation for set value cn2 is stopped. Thus, it is possible to search an optimum value of notch depth coefficient $d_1$ in first notch filter 15 which can suppress machine resonance occurring in motor driving or the like. When notch depth coefficient $d_1$ is gradually reduced, furthermore, the changing operation for notch depth set value cn2 is stopped if set value cn2 corresponding to notch depth coefficient $d_1=0$ is set. In addition, notch depth control portion 20 starts second and subsequent changing operations for notch depth set value cn2 from a current set value.

By the operation described above, the oscillation component is not detected in both signal x1 and signal x2. For this reason, it is determined that signal x1 has no oscillation component at Step S101 in FIG. 4 and the processing proceeds to Step S108. Control determining portion 21 controls switching portion 22 so as to input signal x1 to notch control portion 19 at Step S108. By the processing described above, an oscillation in the control system is set to be suppressed by first notch filter 15. Therefore, the oscillation component is not contained in signal x1 and notch control portion 19 determines that an oscillation does not occur, and the changing operation for set value cn1 is not carried out. If a new oscillation component is contained in signal x1, for example, a load is changed, moreover, the processing proceeds to Step S102 from Step S101 in FIG. 4 and the processing described above for the new oscillation component is executed. In the case in which signal x1 is input to notch control portion 19, zero is input to notch depth control portion 20 and the changing operation for notch depth set value cn2 is not carried out. If signal x1 is input to notch depth control portion 20, moreover, zero is input to notch control portion 19 and the changing operation for notch frequency set value cn1 is not carried out.

Figure 5:
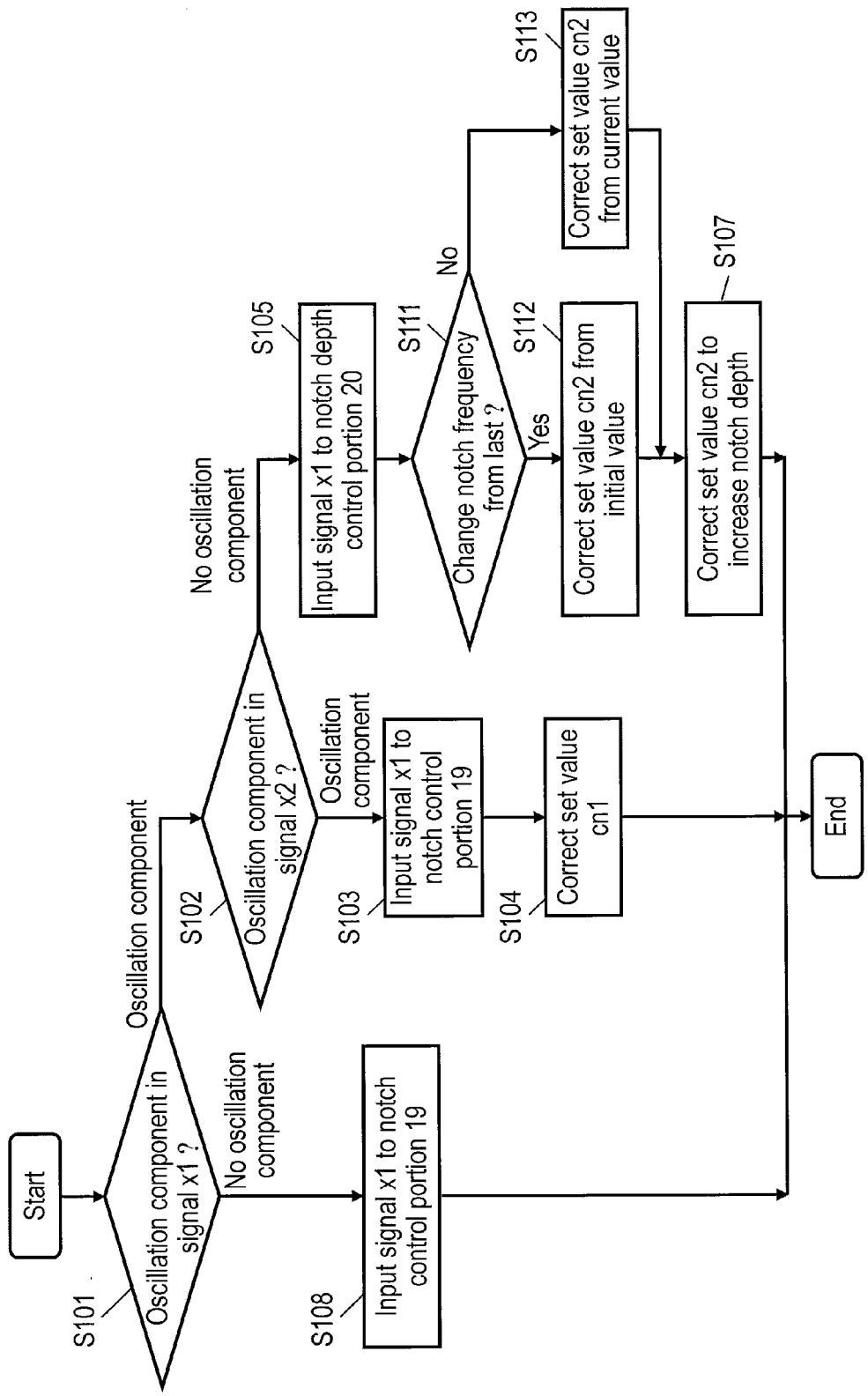
FIG. 5 is a flow chart showing a characteristic set processing of the first notch filter in a structure according to a variant of the motor control apparatus.

Although a first changing operation for set value cn2 is started from the initial value and second and subsequent changing operations for set value cn2 are started from the current set value in the present exemplary embodiment, it is also possible to employ a structure in which the current set value and the initial value are switched depending on a change in notch center frequency ωn2 of second notch filter 18. FIG. 5 is a flow chart showing a characteristic set processing of a first notch filter in the structure according to the variant of the present exemplary embodiment. More specifically, signal x1 is set so as to be input to notch depth control portion 20 at Step S105 and it is then confirmed whether notch center frequency ωn2 is changed from a value in a last changing operation or not at Step S111. If notch center frequency ωn2 is changed, a value at a start of the changing operation for set value cn2 is set to be the initial value at Step S112. If notch center frequency ωn2 is not changed, the value at the start is set to be the current set value at Step S113.

By the structure, if the notch frequency is changed, the changing operation for set value cn2 is stopped earlier. Therefore, it is possible to rapidly suppress the machine resonance.

Second Exemplary Embodiment

In the first exemplary embodiment, the description has been given by taking the example of the structure in which set value cn2 is gradually reduced. On the other hand, in a second exemplary embodiment, there is employed a structure further including a processing for gradually increasing set value cn2. In other words, motor control apparatus 10 according to the present exemplary embodiment has such a structure as to select either an operation for gradually increasing set value cn2 or an operation for gradually reducing set value cn2 as a changing operation for set value cn2 depending on a variation in a control system gain, for example.

Figure 6:
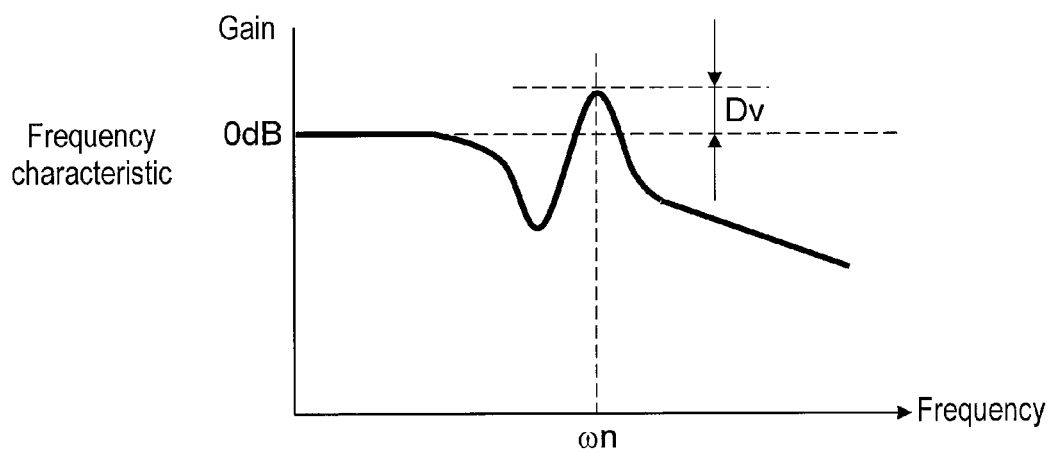
FIG. 6 is a chart showing a gain characteristic of a transfer function for speed detection signal Vd with respect to command speed signal Vr.

First of all, description will be given to a frequency characteristic of a control system containing machine resonance and the like. FIG. 6 is a chart showing a gain characteristic of a transfer function of speed detection signal Vd with respect to command speed signal Vr. In FIG. 6, there is shown an example in which frequency ωn represents a resonance frequency, and machine resonance of resonance frequency ωn occurs when motor control apparatus 10 is used to drive a motor and a load. By setting a gain characteristic in resonance frequency ωn to be equal to or smaller than 0 [dB], the machine resonance is suppressed. In order to suppress the resonance, accordingly, notch depth Dn of first notch filter 15 is required by Dv. In other words, in the processing shown in FIG. 4, a successive changing operation for set value cn2 is carried out until notch depth Dv is obtained from a state of a notch depth of zero to be an initial value of the notch depth by notch depth control portion 20. When the notch depth reaches set value cn2 which is equivalent to Dv, the successive changing operation is stopped. In other words, in the case in which motor control apparatus 10 is used for the control system having the gain characteristic illustrated in FIG. 6, the notch depth of first notch filter 15 reaches Dv by notch depth control portion 20 so that machine resonance is suppressed.

Figure 7:
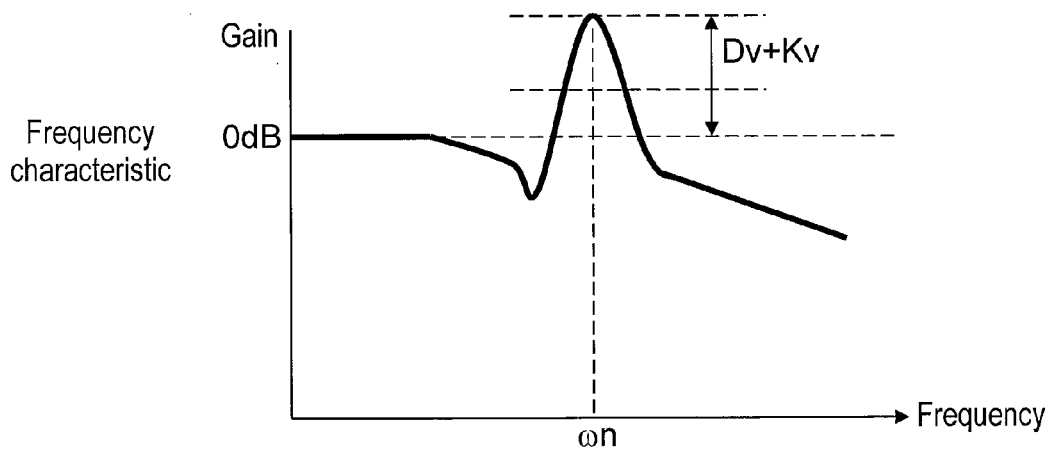
FIG. 7 is a chart showing a gain characteristic in the case in which a control system gain is amplified by Kv.

Next, description will be given to the case in which the control system gain is amplified by Kv. FIG. 7 is a chart showing a gain characteristic in the case in which the control system gain is amplified by Kv. As shown in FIG. 7, the gain characteristic is wholly amplified by Kv and a gain in resonance frequency ωn is also increased by Kv as compared with FIG. 6. For this reason, machine resonance having resonance frequency ωn occurs again. In this case, a resonance frequency is not changed for the machine resonance occurring again. For this reason, second notch filter output signal x2 does not contain an oscillation component. In the processing of FIG. 4, therefore, the processing proceeds to Step S105, and set value cn2 is successively changed and notch depth Dn of first notch filter 15 reaches a value which is equivalent to Dv+Kv so that the machine resonance is suppressed again.

The above description has been given to the operation to be carried out in the case in which the control system gain is increased. In the case in which the control system gain is reduced, however, notch depth Dn is excessively great with respect to the machine resonance having the resonance frequency ωn in the processing of FIG. 4.

In the present exemplary embodiment, there is employed a structure including a processing for gradually increasing set value cn2 in order to reduce notch depth Dn depending on the change in the control system gain in such a manner that notch depth Dn is prevented from unnecessarily being excessively increased.

Figure 8:
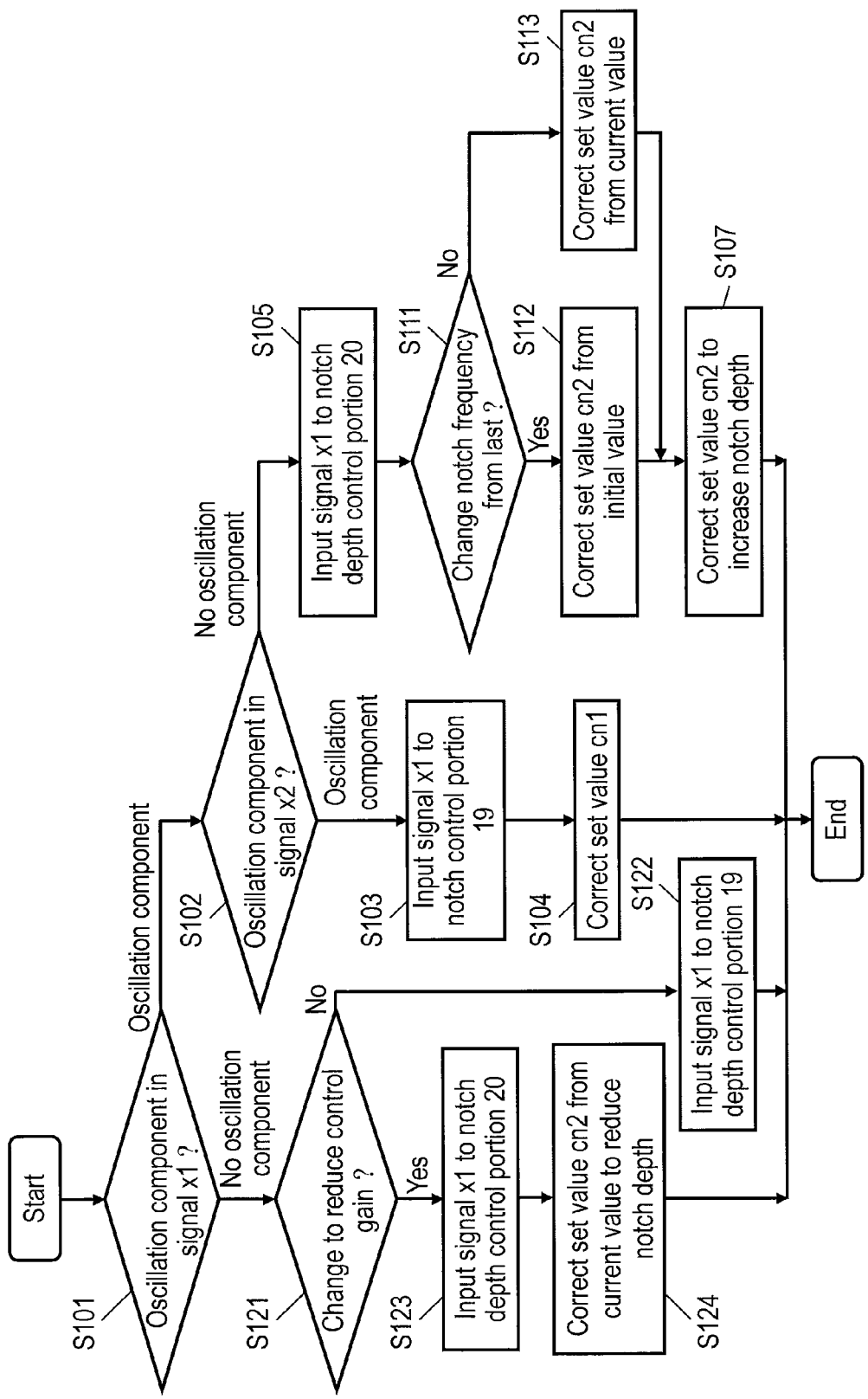
FIG. 8 is a flow chart showing a characteristic set processing of a first notch filter in a motor control apparatus according to a second exemplary embodiment of the present invention.

FIG. 8 is a flow chart showing a characteristic set processing of first notch filter 15 according to the second exemplary embodiment of the present invention. In a comparison with FIG. 5, a processing to be executed in the case in which it is determined that signal x1 has no oscillation component at Step S101 is different in FIG. 8. In FIG. 8, it is determined whether the control system gain is changed to be reduced or not at Step S121. If the control system gain is changed to be reduced, signal x1 is input to notch depth control portion 20 at Step S123 and set value cn2 is corrected to be gradually increased from a current value in such a manner that notch depth Dn is reduced at Step S124. By employing the structure, notch depth Dn is changed to be suitable for the control system gain when the control system gain is changed to reduce the control system gain. According to the structure in accordance with the present exemplary embodiment, thus, optimum notch depth Dn is set depending on the control system gain. It is also possible to employ such a structure as to select, as the changing operation for set value cn2, either of the gradual increasing operation and the gradual reducing operation depending on at least one of a change in notch center frequency ωn1 of first notch filter 15, a change in notch center frequency ωn2 of second notch filter 18, and the change in the control system gain, in addition to the change in the control system gain.

Third Exemplary Embodiment

Figure 9:
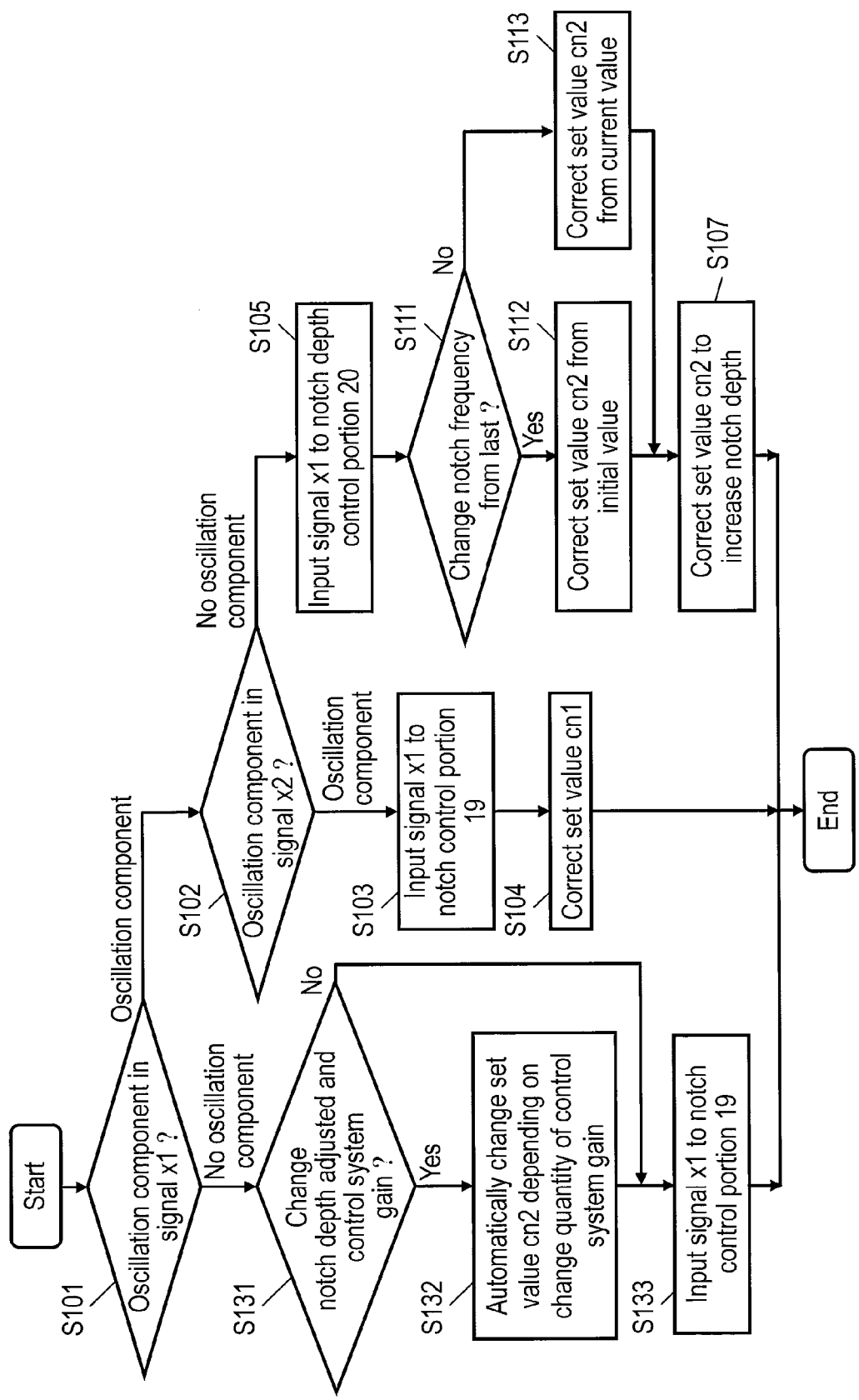
FIG. 9 is a flow chart showing a characteristic set processing of a first notch filter in a motor control apparatus according to a third exemplary embodiment of the present invention.
Figure 10:
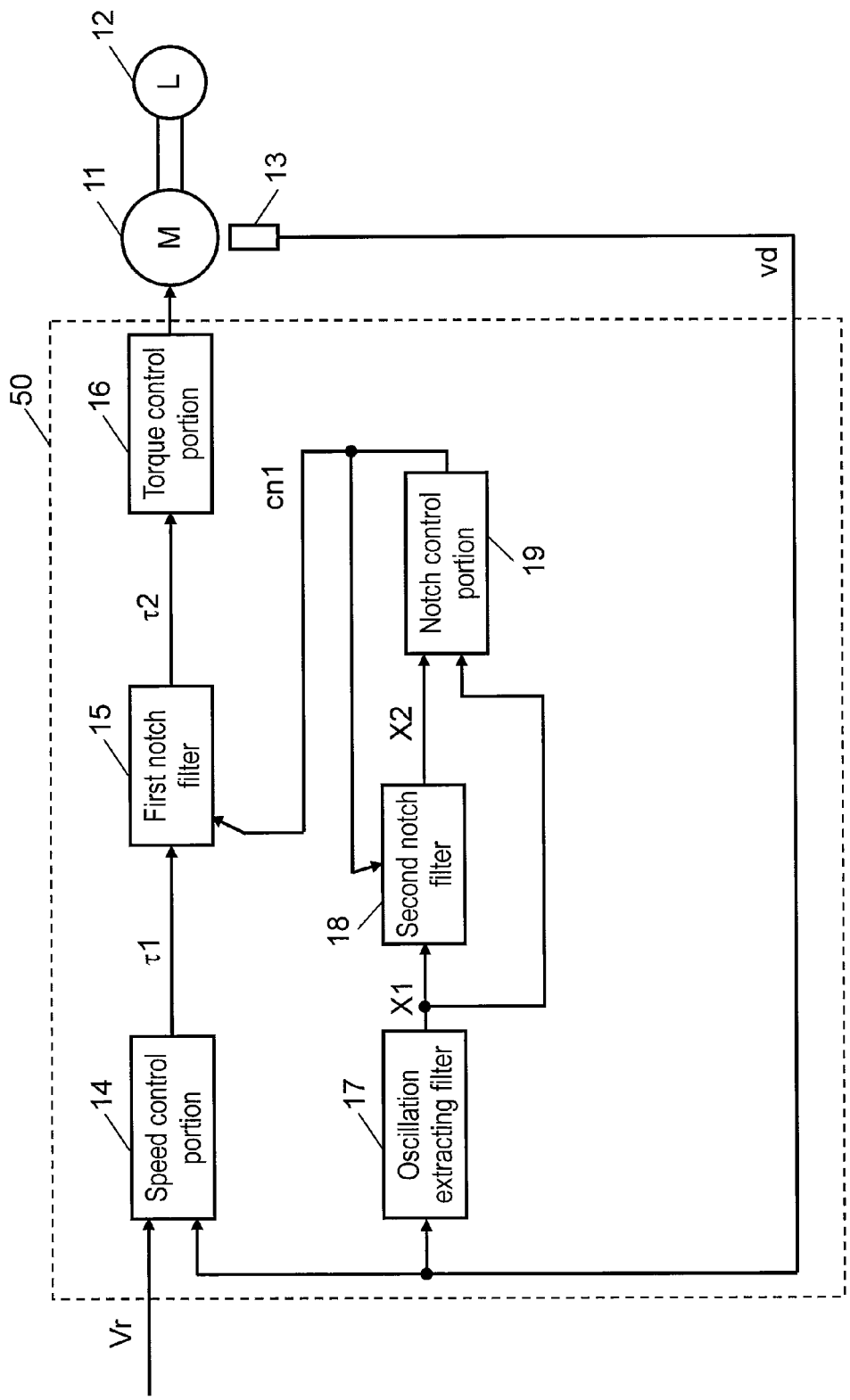
FIG. 10 is a block diagram showing a structure of a conventional motor control apparatus.
Figure 11:
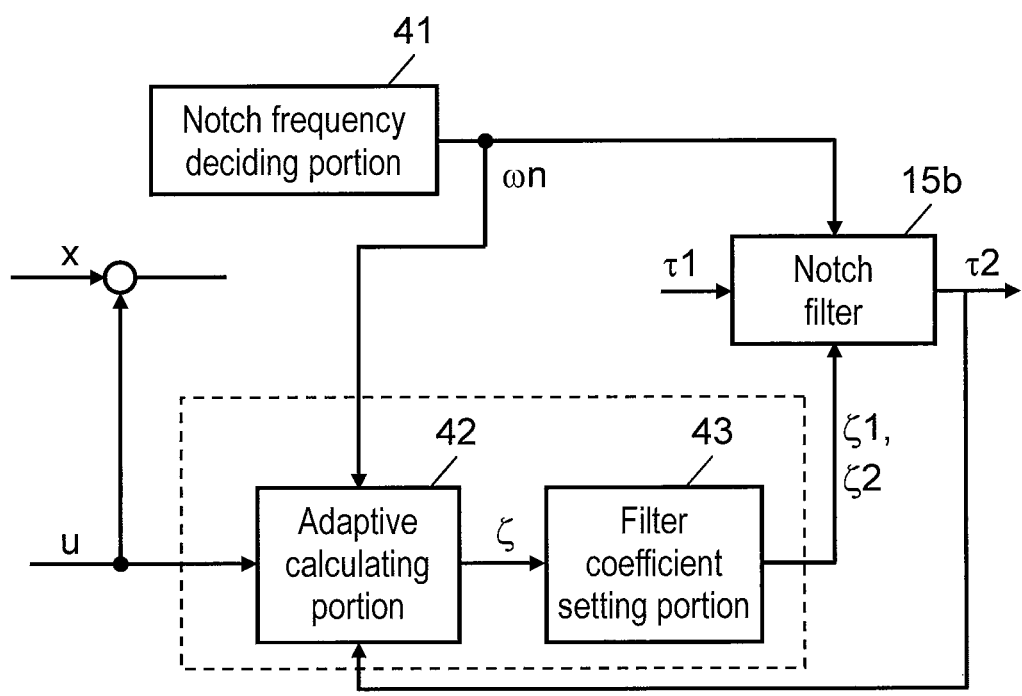
FIG. 11 is a block diagram showing the structure of the conventional motor control apparatus.

FIG. 9 is a flow chart showing a characteristic set processing of first notch filter 15 according to a third exemplary embodiment of the present invention. In the present exemplary embodiment, there is employed a structure in which a change quantity of set value cn2 is calculated by an arithmetical operation when the control system gain is increased as shown in FIG. 7, for example.

More specifically, the processing shown in FIG. 9 has such a structure as to calculate and set the change quantity of set value cn2 depending on a change quantity of a control system gain in second and subsequent changing operations for set value cn2. In other words, set value cn2 is calculated in such a manner that notch depth Dn is greater than a current value by Kv when the control system gain is to be amplified by Kv.

A specific operation will be described with reference to the flow chart of FIG. 9. If it is determined that there is no oscillation component at Step S101, control determining portion 21 confirms whether or not set value cn2 has already been set once, that is, a changing operation for notch depth Dn is once stopped and the control system gain is changed at Step S131. If the changing operation for notch depth Dn is once stopped and the control system gain is changed, notch depth control portion 20 changes set value cn2 by a value corresponding to a change quantity of the control system gain from the current value depending on the change quantity of the control system gain at Step S132. Then, control determining portion 21 controls switching portion 22 so as to input signal x1 to notch control portion 19 at Step S133. Although signal x1 is input to notch control portion 19, extracting oscillation signal x1 has no oscillation component. Therefore, the changing operation for notch frequency set value cn1 is not carried out.

By the structure, in the case in which the control system gain is changed, there is set notch depth Dn which reflects the change quantity of the control system gain and does not unnecessarily increase a phase delay without an occurrence of an oscillation.

As described above, the motor control apparatus according to the present invention includes a first notch filter, an oscillation extracting filter, a second notch filter, a notch control portion, a notch depth control portion, and a control determining portion. The first notch filter is disposed in a feedback control system and can change a notch center frequency and a notch depth. The oscillation extracting filter extracts an oscillation component caused by machine resonance and outputs the oscillation component as an extracting oscillation signal. The second notch filter inputs the extracting oscillation signal and can change the notch center frequency. The notch control portion changes the notch center frequency of the first notch filter and the notch center frequency of the second notch filter to decrease an amplitude of a second notch filter output signal based on the extracting oscillation signal and the second notch filter output signal. The notch depth control portion changes the notch depth of the first notch filter based on the extracting oscillation signal. The control determining portion carries out control to operate either the notch control portion or the notch depth control portion based on the extracting oscillation signal and the second notch filter output signal.

Thus, the motor control apparatus according to the present invention can set the notch center frequency which is coincident with the oscillation frequency of the machine resonance and the optimum value of the notch depth coefficient for suppressing the machine resonance, and can always suppress the machine resonance stably. According to the motor control apparatus in accordance with the present invention, therefore, it is possible to always suppress the machine resonance stably. It is possible to provide a motor control apparatus for controlling a moving operation of a motor or a load thereof while always ensuring a stable control state.

In each of the exemplary embodiments according to the present invention, the description has been given by taking an example of the speed control system as the control system. In the present invention, however, the same function and effect can be exhibited even if there is employed a system structure using a position control system in place of the speed control system.

In each of the exemplary embodiments, moreover, the description has been given by taking an example in which the speed detector detects the speed of the movable portion of the motor. In the present invention, however, it is also possible to employ such a system structure that the speed detector detects the speed of the load. In the present invention, furthermore, it is also possible to employ such a structure that the position of the movable portion or the load of the motor is detected by the position detector and is controlled by the position control system. In the present invention, moreover, it is also possible to employ a control system including a position detector having a structure containing a circuit for differentiating a detection position into a detection speed or a position control system including a speed detector having a structure containing a circuit for integrating a detection speed to detect a position. In other words, the present invention can be applied to a control system for carrying out feedback control in such a manner that the moving operation of the movable portion through the motor follows a moving quantity such as an ordered position or speed. In addition, the moving operation may be a rotating operation of the movable portion through the motor, a rectilinear motion or other motions.

In each of the exemplary embodiments, furthermore, if the amplitude of signal x1 is zero or is equal to or smaller than the threshold, the changing operation for set value cn2 is stopped. In the present invention, however, there is employed a structure in which the changing operation is stopped depending on a moving average value based on a moving average of the amplitude of signal x1.

In each of the exemplary embodiments, moreover, set value cn2 is gradually changed by the notch depth control portion. In the present invention, however, it is also possible to employ a structure in which a change quantity is successively decided based on at least one of a control system gain, a change quantity of the control system gain, and a detection unit of a detection signal.

In each of the exemplary embodiments, furthermore, the description has been given to the motor control apparatus for changing the filter coefficient of the notch filter to suppress the machine resonance. However, the present invention is not restricted to the structures described above but the same effect can be obtained depending on the contents described in the exemplary embodiments by any motor control apparatus for detecting an oscillation component and changing a notch frequency or a notch depth of a notch filter disposed in a speed control or position control system based on a result of the detection, thereby suppressing machine resonance.

Industrial Applicability

A motor control apparatus according to the present invention can suppress an oscillation of machine resonance or the like with high precision and can always control a motor stably. Therefore, the present invention is suitable for an apparatus using a motor such as a component mounting machine or a semiconductor manufacturing apparatus, and particularly, a motor control apparatus for driving such a device as to cause machine resonance.

The invention claimed is:

1. A motor control apparatus in which feedback control is performed on a motor speed or its load, comprising:
a first notch filter operable on a notch center frequency and a notch depth set therein which are both automatically changeable to attenuate an oscillation component on a motor speed control signal;
an oscillation extracting filter that extracts, from a motor speed signal, the oscillation component and outputs an extracted oscillation signal representing the oscillation component;
a second notch filter operable on a notch center frequency set therein which is automatically changeable to attenuate the extracted oscillation signal from the oscillation extracting filter;
a notch control portion responsive to the extracted oscillation signal directly from the oscillation extracting filter and the filtered extracted oscillation signal from the second notch filter to automatically change the notch center frequency of the first notch filter and the notch center frequency of the second notch filter in agreement with a frequency of the extracted oscillation signal;
a notch depth control portion responsive to the extracted oscillation signal directly from the oscillation extracting filter to automatically change the notch depth of the first notch filter; and
a control determining portion that, based on amplitudes of the extracted oscillation signal directly from the oscillation extracting filter and the filtered extracted oscillation signal from the second notch filter, selectively operates mutually exclusive one of the notch control portion or the notch depth control portion in such a manner as to provide the extracted oscillation signal directly from the oscillation extracting filter solely to the selected mutually exclusive one thereof.

2. The motor control apparatus according to claim 1, wherein the oscillation extracting filter is one of a high pass filter for extracting a signal component having a frequency equal to or higher than a predetermined frequency and a band pass filter for extracting a signal component having a frequency which falls within a predetermined frequency bandwidth.

3. The motor control apparatus according to claim 1, wherein the notch control portion performs incremental changes on the notch center frequency of the second notch filter until an amplitude of the filtered extracted oscillation signal from the second notch filter becomes equal to or smaller than a predetermined value, and changes the notch center frequency of the first notch filter at one time to a last value of the notch center frequency of the second notch filter when the amplitude of the filtered extracted oscillation signal from the second notch filter becomes equal to or smaller than the predetermined value.

4. The motor control apparatus according to claim 1, wherein the notch depth control portion incrementally increases the notch depth of the first notch filter from either an initial value or a current value thereof to thereby decrease an amplitude of the extracting oscillation signal directly from the oscillation extracting filter until the amplitude of the extracted oscillation signal directly from the oscillation extracting filter becomes equal to or smaller than a predetermined value.

5. The motor control apparatus according to claim 4, wherein the notch depth control portion decides an amount of a respective incremental change to the notch depth of the first notch filter, based on at least one of a feedback control gain, and a change amount of the feedback control gain.

6. The motor control apparatus according to claim 1, wherein the notch depth control portion incrementally decreases the notch depth of the first notch filter from either an initial value or a current value thereof to thereby increase an amplitude of the extracting oscillation signal directly from the oscillation extracting filter directly until the amplitude of the extracting oscillation signal directly from the oscillation extracting filter becomes equal to or greater than a predetermined value near zero.

7. The motor control apparatus according to claim 6, wherein the notch depth control portion decides an amount of a respective incremental change to the notch depth of the first notch filter, based on at least one of a feedback control gain, and a change amount of the feedback control gain.

8. The motor control apparatus according to claim 1, wherein the notch depth control portion incrementally increase the notch depth of the first notch filter from either an initial value or a current value thereof to thereby decrease a moving average value of an amplitude of the extracted oscillation signal directly from the oscillation extracting filter until the amplitude of the extracting oscillation signal directly from the oscillation extracting filter becomes equal to or smaller than a predetermined value.

9. The motor control apparatus according to claim 8, wherein the notch depth control portion decides an amount of a respective incremental change to the notch depth of the first notch filter, based on at least one of a feedback control gain, and a change amount of the feedback control gain.

10. The motor control apparatus according to claim 1, wherein the notch depth control portion incrementally decreases the notch depth of the first notch filter from either an initial value or a current value thereof to thereby increase a moving average value of an amplitude of the extracting oscillation signal directly from the oscillation extracting filter until the amplitude of the extracting oscillation signal directly from the oscillation extracting filter becomes equal to or greater than a predetermined value near zero.

11. The motor control apparatus according to claim 10, wherein the notch depth control portion decides an amount of a respective incremental change to the notch depth of the first notch filter, based on at least one of a feedback control gain, and a change amount of the feedback control gain.

12. The motor control apparatus according to claim 1, wherein the control determining portion operates to provide the extracted oscillation signal directly from the oscillation extracting filter to the notch control portion when the amplitude of the filtered extracted oscillation signal from the second notch filter is greater than a predetermined value, and operates to provide the extracted oscillation signal directly from the oscillation extracting filter to the notch depth control portion when the amplitude of the filtered extracted oscillation signal from the second notch filter is smaller than the predetermined value.

13. The motor control apparatus according to claim 1, wherein the notch depth control portion incrementally changes the notch depth of the first notch filter in such a manner that the notch depth control portion performs an incremental change to an initial value of the notch depth of the first notch filter if a current notch center frequency of the second notch filter is different from a last notch center frequency of the second notch filter which was observed when the notch depth control portion performed a last incremental change to the notch depth of the first notch filter, whereas performing an incremental change to a current value of the notch depth of the first notch filter if the current notch center frequency of the second notch filter is equal to the last notch center frequency thereof.

14. The motor control apparatus according to claim 1, wherein the notch depth control portion incrementally changes the notch depth of the first notch filter in such a manner that the notch depth control portion decides whether to increase or decrease an amplitude of the extracted oscillation signal based on at least one of a change amount of the notch center frequency of the first notch filter, a change amount of the notch center frequency of the second notch filter, and a change amount of a control system gain.

15. The motor control apparatus according to claim 1, wherein the notch depth control portion changes the notch depth of the first notch filter in such a manner that the notch depth control portion calculates an amount of change to be made to the notch depth of the first notch filter, based on at least one of a change amount of the notch center frequency of the first notch filter, a change amount of the notch center frequency of the second notch filter, and a change amount of a control system gain.

16. The motor control apparatus according to claim 1, wherein the feedback control is performed on either a speed or a position of the motor or its load.

* * * * *